Figure 1:
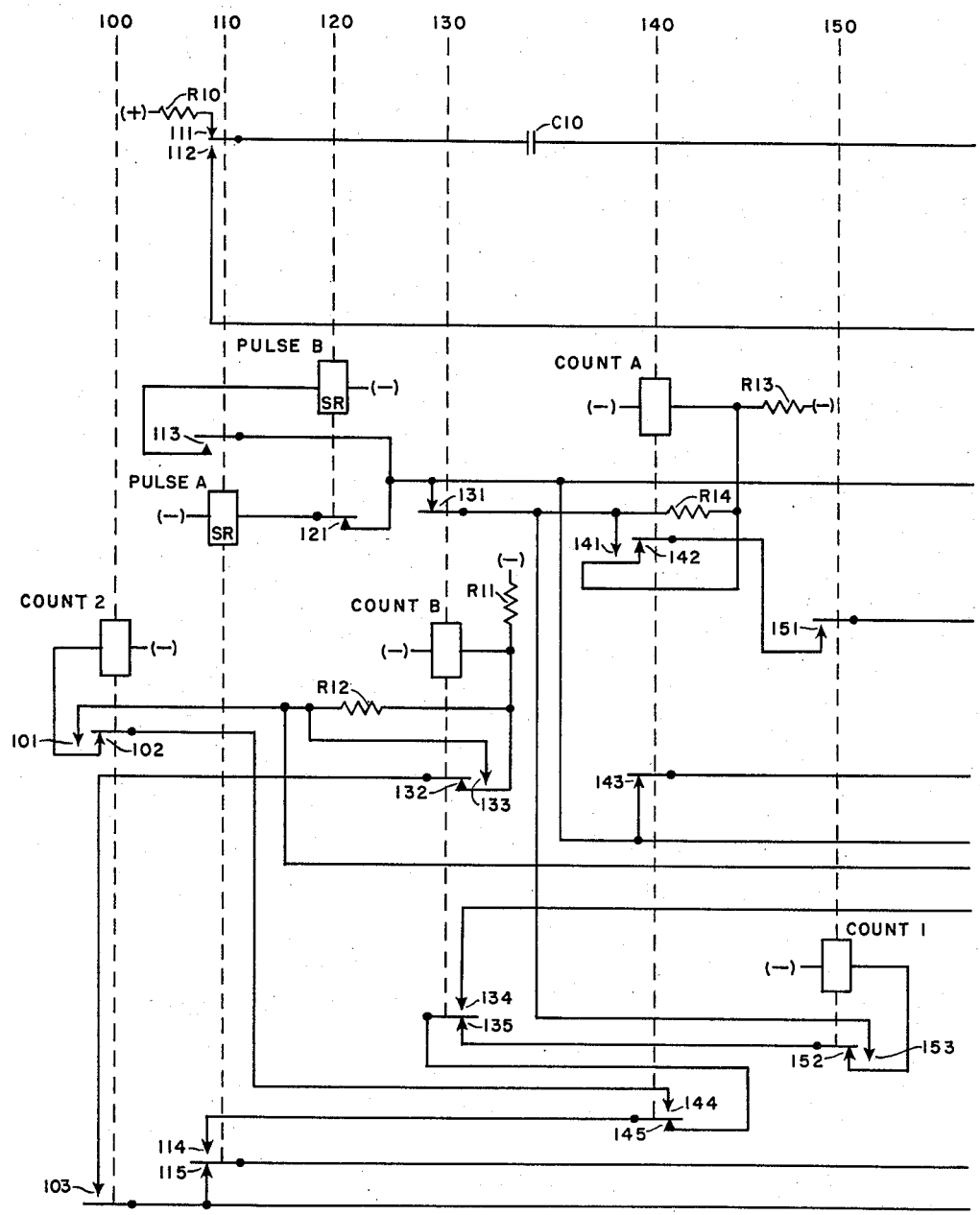

Sept. 1, 1959     M. A. CLEMENT ET AL     2,902,638
APPARATUS FOR TESTING GAS TUBES
Filed Oct. 22, 1956     3 Sheets-Sheet 1

INVENTORS.
MILTON A. CLEMENT
RICHARD K. BOYD
BY
AGENT

United States Patent Office

2,902,638
Patented Sept. 1, 1959

2,902,638

APPARATUS FOR TESTING GAS TUBES

Milton A. Clement and Richard K. Boyd, Rochester, N.Y., assignors to General Dynamics Corporation, Rochester, N.Y., a corporation of Delaware Application October 22, 1956, Serial No. 617,291

15 Claims. (Cl. 324—26)

This invention relates to apparatus for testing multi-electrode gas tubes.

Multielectrode gas tubes of the type having at least an anode, starting anode and cathode electrodes are well known. A characteristic of such tubes is that within a known range of voltage applied between the anode and cathode, the tube should not conduct or fire until a so-called firing voltage of at least a minimum value is applied between the starting anode and cathode. However, once the tube has fired, i.e., the gas within the tube is ionized and therefore conductive, the tube will remain conductive regardless of the value of the voltage subsequently applied between the starting anode and cathode so long as the requisite voltage applied between anode and cathode is maintained.

In the past, it has been the practice to provide gas tube testing apparatus arranged for incrementally increasing the starting or control voltage applied between the gas tube cathode and the starting anode in series addition with a voltage impulse of fixed amplitude in order to determine the point at which the tube under test fires. Such apparatus is disclosed in the application of Frank A. Morris, Serial No. 479352, filed January 3, 1955, issued August 28, 1956, as Patent No. 2,761,104, and assigned to the same assignee as the present application. Such testing devices offer a possible disadvantage in that they do not exactly simulate the operating conditions generally encountered in circuits in which the tubes under test are used. In practice, a gas tube is usually connected in a circuit with a fixed potential existing between the control or starting anode and cathode and additional circuit arrangements are provided to thereafter apply a voltage impulse between the cathode and starting anode sufficient to fire the tube. The tube testing procedure for incrementally increasing the control voltage in the above-described manner may not determine whether or not the tube will operate satisfactorily in the circuit for which it is intended since the testing apparatus does not approximately reproduce the expected operating conditions. Furthermore, testing techniques of the type described in the Morris application may not allow for possible instability in the firing voltage requirements of the tube under test.

Accordingly, it is an object of our invention to provide a new and improved means for testing multielectrode gas tubes.

Another object of our invention is to determine the amplitude of an impulse applied between the cathode and the starting anode required to fire the tube under test.

Another object of our invention is to determine the amplitude of an impulse applied between the cathode and the starting anode required to fire the tube undergoing test under conditions approximating those found in circuits usually connected to the tube being tested.

Still another object of our invention is to determine the lowest value of voltage impulse applied between the starting anode and cathode required to fire the tube under test.

Still another object of our invention is to provide a new and improved method of indicating to the operator the point at which a tube under test fires.

We accomplish these and other objects by providing apparatus for testing a gas tube wherein the gas tube comprises an anode, a starting anode and a cathode. The apparatus includes means for applying voltage from a first source between the anode and the cathode sufficient to maintain the ionization of the tube, so that the tube may continue to conduct current between the anode and cathode after it has been fired. According to the invention, means comprising a circuit is effective for applying a fixed voltage from a second source between the starting anode and the cathode of the tube insufficient to ionize or fire the tube. In order to determine the so-called dynamic characteristic of the tube under test, i.e., the point at which the tube fires in response to the application of voltage impulse between the starting anode and the cathode, means is provided for adding a series of voltage impulses from a third source to the fixed voltage already present between the starting anode and the cathode. Other means operative through a succession of conditions is provided for increasing the voltage from the third source by a corresponding succession of increments. When the value of the combined biasing and a particular series of impulse voltages have been increased to the point sufficient to ionize the tube, detecting means operative in response to the increased current flow in the cathode-anode circuit is operated for the purpose of operating the next described means for indicating the starting voltage required to fire the tube. Thereafter, the voltage increasing means is returned to normal and the above-described testing operation repeated. The testing apparatus continues through as many of the above-described cycles of operations as the operator thinks are necessary to determine whether or not the tube under test is satisfactory.

In order to indicate to an operator the point at which the tube under test fires, a plurality of indicating elements is provided. Each element has an individual energizing circuit and corresponds to one of the operated conditions to which the voltage increasing means is operated throughout a testing cycle. The voltage increasing means in any one of its operated conditions in effective for preparing the corresponding one of the energizing circuits. The aforementioned detecting means is operative for completing the prepared one of the circuits for a predetermined time interval during each cycle of operation. In this manner the operator is given the value of the voltage required to be applied to the starting anode circuit by a succession of operations of a single one of the indicating elements, thereby making easier the task of determining whether or not the tube under test is acceptable.

Figure 2:
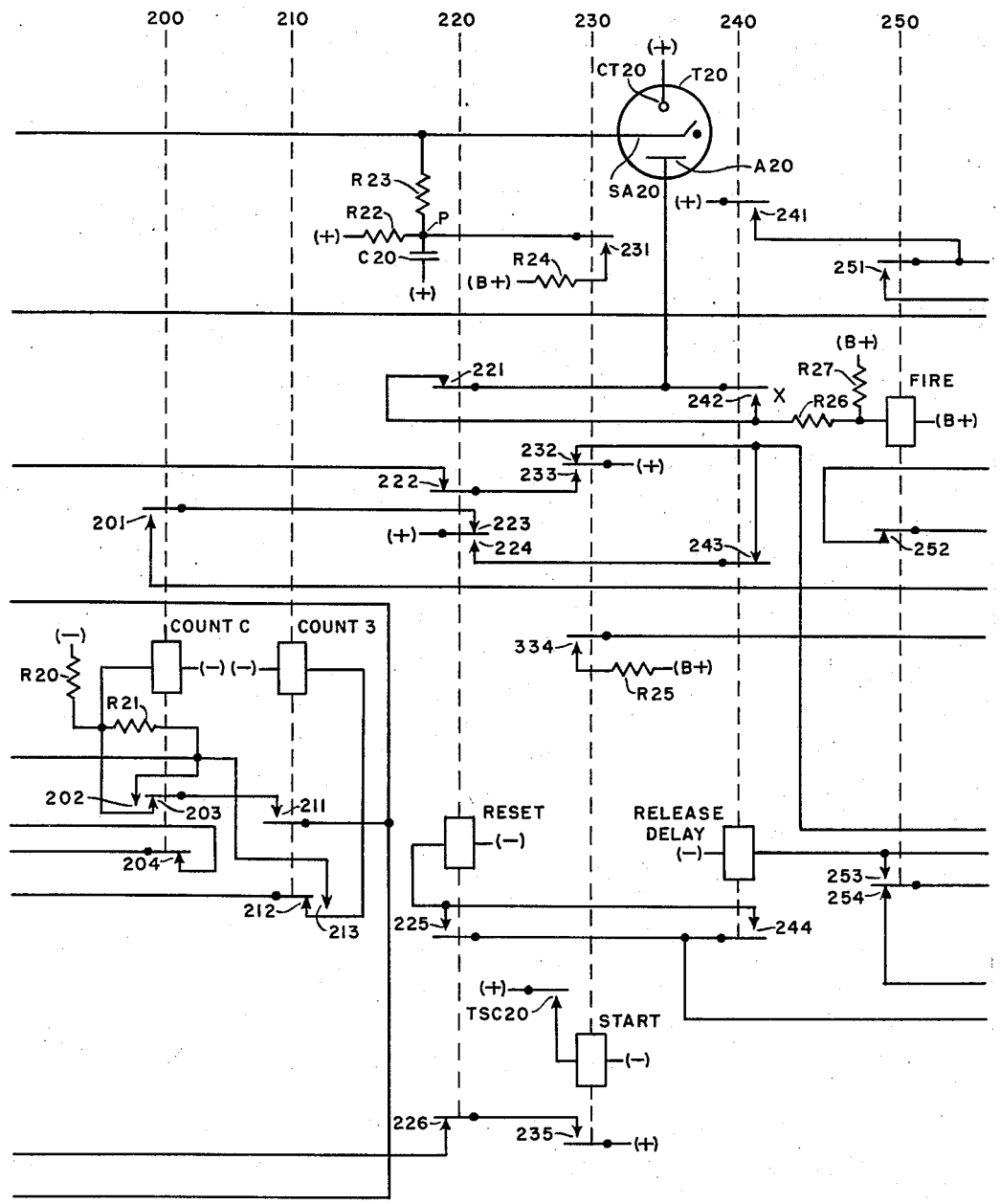
Figure 3:
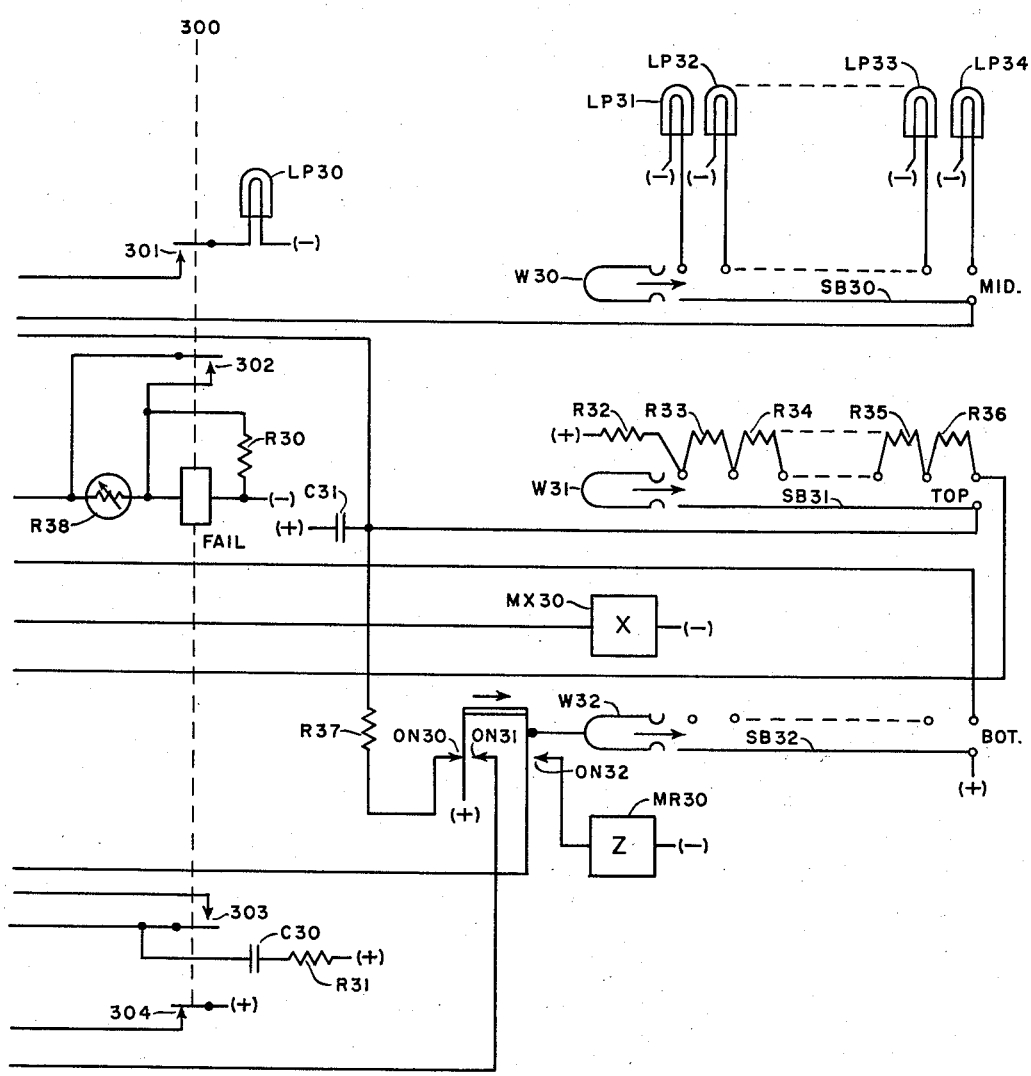

For a better understanding of our invention, reference is made in the following description to the accompanying drawings in which Figs. 1–3, when arranged in numerical order from left to right, show apparatus suitable for testing gas type tubes and forming the preferred embodiment of our invention.

Power for the apparatus is drawn from two sources. The first source is a 150-volt B battery; the most negative plate or terminal of the B battery is connected to ground and is hereafter referred to as "ground" and in the drawings as (+); the most positive terminal of the B battery is referred to as "B+" in both drawings and written description. The second source is a 48-volt telephone exchange battery; the most positive plate or terminal of the exchange battery is connected to ground (and therefore to the most negative terminal of the B battery) and is hereafter referred to as "ground" and in the drawings as (+); the most negative, ungrounded plate or terminal is referred to as "battery" and in the drawings as (−).

In order to test a multielectrode gas tube, such as T20, the tube is inserted in a socket associated with the test apparatus so that cathode CT20 is connected to ground and anode A20 is connected through break contacts 221, resistor R26, and the winding of fire relay 250 to B+. Starting anode SA20 is connected to a voltage dividing circuit including resistors R22 and R24 through resistor R23. The operation of the dividing circuit is to be explained presently. The insertion of the tube T20 into its socket is also effective for closing tube socket contacts TSC20, thereby completing an obvious circuit for energizing the winding of start relay 230. Relay 230 thereupon operates.

The operation of relay 230 is effective for completing the aforementioned potential dividing circuit from B+ through resistor R24, make contacts 231 and resistor R22 to ground. In order to raise starting anode SA20 at a fixed potential, positive with respect to ground, SA20 is connected to the dividing circuit at point P by a high value resistor R23. The fixed potential so applied between cathode CT20 and starting anode SA20 is insufficient to fire tube T20. The operation of relay 230 is further effective for starting the counting means comprising relays 110 through 210, inclusive, in their cyclical operation in the manner next explained.

The operation of relay 230 is effective for causing the cyclical operation of pulse A and pulse B relays 110 and 120, respectively, by completing an operating circuit for relay 110 from ground through make contacts 233, break contacts 222 and 121, and the winding of relay 110 to battery. Relay 110 thereupon operates. The operation of relay 110 is effective for closing an operating circuit for relay 120 from ground through make contacts 233, break contacts 222, make contacts 113, and the winding of relay 120 to battery. Relay 120 thereupon operates. The operation of relay 120 is effective for opening the above-traced circuit for operating relay 110 at break contacts 121. Relay 110 thereupon releases. The release of relay 110 is effective for opening the above-traced circuit for relay 120 at make contacts 113. Relay 120 thereupon releases. The release of relay 120 recompletes the above-traced operating circuit for relay 110 at break contacts 121 and marks the end of a single cycle of operations of the pulsing relays 110 and 120. Relays 110 and 120 continue to operate in this manner so long as ground is connected to the above-described operating circuits at make contacts 233.

The cyclical operation of relays 110 and 120 is effective for causing impulse dividing relays such as 100, 130, 140, 150, 200 and 210 to measure off a fixed number of complete cycles of operations of relays 110 and 120. While the number of such operations described here is three, it is to be understood that the impulse dividing relays may be modified or added to in any of a number of ways well understood to those skilled in the art to measure off any number of cyclical operations of relays 110 and 120. The manner in which the cycle measuring operation is accomplished is next described.

The operation of relay 230 is effective in response to the operation of relay 110 during the first cycle of operations of relays 110 and 120 for closing an operating circuit for count 1 relay 150 from ground through make contacts 235, break contacts 226, make contacts 114, break contacts 145, 135 and 152, and the winding of relay 150 to battery. Relay 150 operates and thereupon is effective for closing a locking circuit for itself from ground through make contacts 233, break contacts 222 and 131, make contacts 153, and the winding of relay 150 to battery. The operation of relay 150 is effective for preparing an operating circuit for count A relay 140 at make contacts 151.

Upon the advance of relays 110 and 120 in their first cycle of operations to the point where relay 110 has released, a circuit is completed for operating count A relay 140 from ground through make contacts 235, break contacts 226 and 115, make contacts 151, break contacts 142, and the winding of relay 140 to battery. Relay 140 thereupon operates and is effective for closing a locking circuit for itself from ground through make contacts 233, break contacts 222 and 131, make contacts 141, and the winding of relay 140 to battery. The operation of relay 140 is also effective for preparing an operating circuit for count 2 relay 100 at make contacts 144. The operation of relay 140 is also effective for opening a locking circuit for count C relay 200 at break contacts 143.

During the second cycle of operations of relays 110 and 120, while relays 140 and 150 are operated, the operation of relay 110 is effective for closing an operating circuit for count 2 relay 100 from ground through make contacts 235, break contacts 226, make contacts 114 and 144, break contacts 102, and the winding of relay 100 to battery. Relay 100 thereupon operates. The operation of relay 100 is effective for closing a locking circuit for itself from ground through make contacts 233, break contacts 222 and 204, make contacts 101, and the winding of relay 100 to battery. The operation of relay 100 is further effective for preparing an operating circuit for count B relay 130 at make contacts 103. Thereafter, upon the release of relay 110 during the second cycle of operations of relays 110 and 120, a circuit is completed for operating count B relay 130 from ground through make contacts 235, break contacts 226 and 115, make contacts 103, break contacts 132, and the winding of relay 130 to battery. Relay 130 thereupon operates.

The operation of relay 130 is effective for closing a locking circuit for itself from ground through make contacts 233, break contacts 222 and 204, make contacts 133, and the winding of relay 130 to battery. The operation of relay 130 is further effective for opening the above-traced holding circuits for relays 140 and 150 at break contacts 131. Relays 140 and 150 thereupon release. The operation of relay 130 is further effective for preparing an operating circuit for count 3 relay 210 at make contacts 134 and for opening the above-traced operating circuit for relay 150 at break contacts 135.

During the third cycle of operations of relays 110 and 120, upon the operation of relay 110 a circuit is completed for operating count 3 relay 210 from ground through make contacts 235, break contacts 226, make contacts 114, break contacts 145, make contacts 134, break contacts 212, and the winding of relay 210 to battery. Relay 210 thereupon operates.

The operation of relay 210 is effective for closing a locking circuit for itself from ground through make contacts 233, break contacts 222 and 143, make contacts 213, and the winding of relay 210 to battery. The operation of relay 210 is also effective for preparing an operating circuit for count C relay 200 at make contacts 211.

During the third cycle of operations of relays 110 and 120, upon the release of relay 110 a circuit is completed for operating count C relay 200 from ground through make contacts 235, break contacts 226 and 115, make contacts 211, break contacts 203, and the winding of relay 200 to battery. Relay 200 thereupon operates. The operation of relay 200 is effective for closing a locking circuit for itself from ground through make contacts 233, break contacts 222 and 143, make contacts 202, and the winding of relay 200 to battery. The operation of relay 200 is further effective for opening the above-traced holding circuit for relays 100 and 130 at break contacts 204. Relays 110 and 130 thereupon release. The operation of relay 200 is further effective for energizing magnet MX30 of the minor switch from ground through break contacts 223, make contacts 201, and magnet MX30 to battery. The effects of energizing magnet MX30 are explained presently.

During the next cycle of operations of relays 110 and 120, relays 140 and 150 are reoperated in the above-described manner. The operation of relay 140 is effective for opening the above-described holding circuits for relays 200 and 210 at break contacts 143. The resulting release of relays 200 and 210 marks the end of a cyclical operation of impulse dividing relays 100, 130, 140, 150, 200 and 210. The above-described operation of the impulse dividing relays is maintained as long as relays 110 and 120 continue to cyclically operate. The manner in which the counting means including relays 100 to 210, inclusive, is used for driving the remaining apparatus is next described.

The release of relay 200 is effective for opening the above-described energizing circuit of magnet MX30 at make contacts 201. The energization and deenergization of magnet MX30 is effective for advancing the wiper set including wipers W30, W31, and W32 of the minor switch one step in the direction away from its normal position and engages one of the wiper bank terminal sets.

Returning to the consideration of tube T20, it is desired to apply a plurality of series of voltage impulses (positive with respect to ground) from a voltage source, such as charged capacitor C31, in addition to the above-described fixed bias between starting anode SA20 and cathode CT20 where the impulses within any one series have the same value. The amplitude of each successive impulse series is to be increased to an upper limit or until the tube under test fires. To the end of increasing the amplitude of successive impulse series, means comprising the aforementioned minor switch including middle, top and bottom banks of terminals which are engaged by wipers W30, W31 and W32, respectively, is provided.

In order to provide incremental voltage steps between zero and 100 on capacitor C31, the first of a plurality of series-connected resistors including R33, R34, R35 and R36 is connected to ground and the last is connected to B+ through make contacts 234 and resistor R25. Because resistors R33 through R36 are of substantially equal value, the voltages at the taps between the resistors provide a series of voltages positive with respect to ground where the increment between adjacent taps is substantially fixed throughout the length of the resistor chain. Each tap is connected to one of the terminals in the top bank in such a manner that the voltage applied to wiper W31 is increased by a series of equal increments as that wiper is moved into engagement with the various terminals in a direction away from the normal position of the wiper set. During the time that the wiper set is in its normal position, capacitor C31 is maintained at ground potential by its connection to ground through resistor R37 and off-normal break contacts ON30. The movement of the minor switch wiper set away from its normal position is effective to open this shorting circuit at break contacts ON30. Thereupon capacitor C31 which is connected to shorting bar SB31 and therefore wiper W31 is charged to the voltage on the one of the above-described taps engaged by wiper W31. Capacitor C31 connected to wiper W31 is therefore successively charged to the voltages present on the top bank terminals as the minor switch wiper set is advanced across its terminal banks.

Assuming that the minor switch wiper set has been moved into engagement with the first terminal set in the minor switch bank in the previously described manner, during that part of the cyclical operation of relays 110 and 120 when relay 110 is in released condition, capacitor C10 which is connected to starting anode SA20 is charged to the fixed voltage at which starting anode SA20 is maintained over a circuit traced from ground through R10 and break contacts 111. Capacitor C10 is thereafter used for connecting the voltage source C31 between grounded cathode CT20 and starting anode SA20 to be added to the fixed voltage already present between those elements. Thus upon each operation of relay 110 charged, capacitor C10 is transferred from its above-traced ground connection at break contacts 111 and into connection with capacitor C31 through make contacts 112. Thus it is seen that as wiper W31 is advanced across the top terminal bank, a series of voltage impulses at each of a number of increasing amplitudes are applied between starting anode SA20 and cathode CT20.

It is to be recalled that relay 200 operates and releases upon the occurrence of each third cycle of operations of relays 110 and 120, and that the operation and release of relay 200 is effective for causing minor switch magnet MX30 advance the wiper set into engagement with the next successive terminal bank set. Thus the three operations and releases of relay 110 are effective for connecting a series of three voltage impulses between the cathode and starting anode of the tube under test before the wiper set of the minor switch is again advanced to raise the voltage on capacitor C31. Any one of the resulting three voltage peaks applied between the cathode and starting anode may be sufficient to fire the tube under test. In the event that the tube under test does not fire at this point the implsing relays 110 and 120 and impulse dividing relays 100 and 130—210 continue to operate in the above-described manner until the tube fires. The wiper set is advanced by successive energization of or until the wiper set is advanced into engagement with the last terminal set in the banks. The application of the above-described series of impulses at each voltage value between the cathode and starting anode is carried out because the tube under test may be unstable with respect to the peak starting voltage required to make it fire. The application of a series of successive impulses of a particular value between starting anode SA20 and cathode CT20 tends to insure that the voltage impulse effective to fire the tube under test with the next described results is the lowest possible value.

Assuming that the tube under test fires before the wiper set is driven into engagement with the last set of minor switch bank terminals, the gas within tube T20 ionizes to conduct current between cathode CT20 and anode A20. The firing of tube T20 is indicated by the flow of sufficient current in the anode-cathode circuit to operate detecting means including firing relay 250. The circuit for operating relay 250 is traced from ground through cathode CT20 to anode A20, break contacts 221, resistor R26, and the winding of relay 250 to B+. Relay 250 thereupon operates. Current continues to flow in the above-traced circuit regardless of the value of the voltage applied between cathode CT20 and anode SA20 until the above-traced circuit is opened for a time interval sufficient to allow the gas in tube T20 to deionize. The circuit opening process is to be explained presently.

The operation of relay 250 is effective for completing an operating circuit for release delay relay 240 from battery through the winding of relay 240, make contacts 253, discharged capacitor C30 and resistor R31 to ground. Relay 240 thereupon operates and remains operated until capacitor C30 becomes charged to the point where current flowing through the above-traced circuit falls to a point where the magnetic flux in the core of relay 240 is insufficient to hold that relay operated. The release of relay 240 is to be explained in more detail presently. The operation of relay 250 is further effective for disconnecting the winding of failure relay 300 from the last terminal in the bottom bank of the minor switch at break contacts 252.

As indicated above, relay 240 remains operated until current flowing through its winding and capacitor C30 falls to the point where slow-release type relay 240 releases. At this time a circuit is completed for completing an operating circuit of the appropriate one of the plurality of indicating means comprising lamps such as LP31, LP32, LP33 and LP34 in the manner to be explained next. Each of the lamps, such as LP31, is connected to one of the terminals in the middle bank through an operating circuit consisting of a conductor individual to the lamp. Thus the operation of the wiper set is effective for preparing the energizing circuit of the lamp connected to the middle terminal of the set on which the wiper set is stopped when tube T20 fires. In the case being discussed here, the appropriate energizing circuit is completed during the time that relays 240 and 250 are operated and is traced from ground through make contacts 241 and 251, shorting bar SB30, wiper W30, the energizing circuit individual to lamp LP34, and through lamp LP34 to battery. The lamp circuit is maintained energized until the completing path is opened by the release of relay 240 at make contacts 241. The time interval for which relay 240 holds the above-traced lamp circuit energized is sufficient to make the lighting of the particular lamp easily noted by the operator of the test equipment.

In order to maintain tube T20 in its fired condition after relay 220 has operated and thereby opened the previously traced circuit at break contacts 221, the operation of relay 240 is effective for closing an alternate path between B+ and anode A20 through preliminary make contacts 242 which are in parallel with break contacts 221. The operation of relay 240 is further effective for opening an energizing circuit for release magnet MR30 at break contacts 243 in order to delay the release of the minor switch wiper set from its operated to normal position. The operation of relay 240 is further effective for closing an operating circuit for reset relay 220 from ground through make contacts ON31 and 244, and the winding of relay 220 to battery. Relay 220 thereupon operates.

The operation of relay 220 is effective for opening the above-described operating circuits for impulsing relays 110 and 120 and holding circuit for relays 100, 130, 140, 150, 200 and 210 at break contacts 222; similarly, the operating circuits for relays 100, 130, 140, 150, 200 and 210 are opened to break contacts 226. The impulsing means and impulse dividing means are thereupon restored to their normal condition. The operation of relay 220 is further effective for closing a locking circuit for itself from ground through make contacts ON31 and 225, and the winding of relay 220 to battery. The operation of relay 220 is further effective for opening the above-described energizing circuit for magnet MX30 at break contacts 223. The operation of relay 220 is further effective for preparing an energizing circuit for release magnet MR30 at make contacts 224.

The operation of relay 220 is effective upon the above-described release of relay 240 for completing an energizing circuit for release magnet MR30 from ground through make contacts 224, break contacts 243, make contacts ON32, and the winding of magnet MR30 to battery. The operation of relay 220 is further effective in response to the release of relay 240 for opening the above-described anode-cathode circuit of tube T20 for a time interval sufficient to allow tube T20 to deionize. This is accomplished by holding the above-traced original and alternate circuits for connecting anode A20 to B+ at break contacts 221 and make contacts 242, respectively. Deionizing the tube T20 cuts the flow of current through the above-traced circuit including the winding of relay 250 to the point where relay 250 releases. The release of relay 250 is effective for opening the above-described operating circuit for relay 240 at make contacts 253 and for closing a discharge circuit for capacitor C30 from ground through break contacts 304 and 254 to the left-hand terminal of capacitor C30.

The energization and resulting operation of magnet MR30 is effective for restoring the wiper set including wipers W30, W31 and W32 from its advanced to normal position. The above-described off-normal means is thereupon restored to normal condition. The restoration of the off-normal means to normal condition is effective for opening the above-described holding circuit for relay 220 at make contacts ON31. Relay 220 thereafter releases. Similarly, the above-described operating circuit of magnet MR30 is opened at make contacts ON32. The restoration of the counting means and a minor switch to normal condition along with the restoration of relays 220, 240 and 250 places the testing means in the condition that it held at the outset of the test. Thereafter the apparatus repeats the above-described manner until tube T20 is removed from its socket, thereby opening the above-described operating circuit of start relay 230 at tube socket contact TSC20.

In the event that tube T20 fails to fire upon the application of the maximum impulse between starting anode SA20 and cathode CT20 (i.e., after the wiper set has been advanced into engagement with the last terminal set in the banks), the advance of wiper W32 into engagement with the last terminal in the bottom bank is effective for completing a circuit for energizing failure relay 300. The energizing circuit of relay 300 is traced from ground through shorting bar SB32, wiper W32, break contacts 252, thermistor R38, and the winding of relay 300 to battery. When the above-traced energizing circuit is completed, the normally high resistance of thermistor R38 is sufficient to prevent enough current to operate relay 300 from flowing. However, in the presence of 48 volts, the resistance of thermistor R38 is reduced within a time interval characteristic of thermistor R38 to the point where sufficient current flows in the above-traced circuit to allow relay 300 to operate. In this manner the operation of relay 300 is delayed for a predetermined time interval after its operating circuit has been closed.

The operation of relay 300 is effective for closing a locking circuit for itself from battery through the winding of relay 300, make contacts 302, break contacts 252, wiper W32, and shorting bar SB32 to ground. The operation of relay 300 is also effective for closing an operating circuit for relay 240 from battery through the winding of relay 240, make contacts 303, capacitor C30, and resistor R31 to ground. Relay 240 thereupon operates. The operation of relay 300 is also effective for opening the above-described discharge circuit for capacitor C30 at break contacts 304.

The operation of relays 240 and 300 is effective for completing a circuit for energizing failure lamp LP30 from ground through make contacts 241 and 301 and lamp LP30 to battery. The operation of relay 240 is effective in the above-described manner to complete the operating circuit for reset relay 220. The operation of relay 220 is effective in the above-described manner for restoring the impulsing means and impulse dividing means to their normal conditions. The operation of relay 220 and the subsequent release of relay 240 in the above-described manner is also effective to open the connection between anode A20 and B+ in order to deionize tube T20 and to operate minor switch release magnet MR30, thereby restoring the wiper set of the minor switch to its normal position. The restoration of the minor switch wiper W32 to its normal position is effective for opening the above-described energizing circuit for relay 300 so that relay 300 releases. The testing apparatus is then in normal condition and prepared to go through the above-described cycle of operations again. The test apparatus continues to operate in this manner until tube T20 is removed from its socket to release start relay 230 in the above-described manner.

While we have shown and described the preferred embodiment of our invention, other modifications of our apparatus will occur to those skilled in the art. We, therefore, aim in the appended claims to cover all such modifications as fall within the true spirit and scope of our invention.

What is claimed is:

1. In a device for testing a gas tube wherein said tube has at least anode, starting and cathode electrodes, a first voltage source, said first source being connected between said anode and said cathode and sufficient to maintain said tube in its ionized condition, a second voltage source, said second source being connected between said cathode and said starting anode and having a value insufficient to fire said tube, a third voltage source, impulsing means for momentarily connecting voltage impulses from said third source between said cathode and said starting anode in order to apply the sum of said second and said third source voltages between said cathode and said starting anode, and means for progressively increasing the voltage of said third source, whereby the total voltage applied between said cathode and said starting anode is progressively increased in order to determine the dynamic condition of said tube.

2. The testing device set forth in claim 1 wherein said voltage increasing means is operable through a plurality of steps and effective for increasing the voltage of said third source by a corresponding number of steps.

3. The testing device set forth in claim 1 wherein said impulsing means is cyclically operative and said voltage increasing means is operable through a plurality of steps, and having in addition means operative in response to each of a predetermined number of cyclical operations of said impulsing means for causing said voltage increasing means to be advanced one step.

4. I a device for testing a tube wherein said tube comprises an anode, a starting anode and a cathode, a first voltage source, said first source being connected between said anode and said cathode and sufficient to maintain said tube in ionized condition, another voltage source, impulsing means cyclically operative for applying voltage impulses from said other source between said starting anode and said cathode, means operative from a normal condition through a series of steps under the control of said impulsing means for increasing the voltage of said other source through a corresponding series of steps, a plurality of indicating elements and a corresponding plurality of circuits, each of said circuits being used for energizing the corresponding one of said indicating elements, each of said elements and circuits corresponding to one of the operated steps of said voltage increasing means, said voltage increasing means in any one of its operated conditions being effective for completing the corresponding one of said circuits, detecting means for determining when an ionized condition exists in said tube, and energizing means operative for a predetermined time interval in response to the operation of said detecting means for energizing the completed one of said circuits.

5. The device set forth in claim 4 and having in addition releasing means for restoring said voltage increasing means to normal condition, and means operative in response to the operation of said energizing means for operating said releasing means.

6. The device set forth in claim 4 and having in addition releasing means for restoring said voltage increasing means to normal condition, and means operative in response to the operation of said energizing means for operating said releasing means and for restoring said impulsing means to its normal condition.

7. The testing device set forth in claim 4 and having in addition releasing means for restoring said voltage increasing means to normal condition, failure means for indicating an un-ionized condition in said tube, a circuit for actuating said failure means, controlling means operative in response to the operation of said energizing means for operating said releasing means, and means operative in response to the operation of said voltage increasing means to the final one of its series of steps for completing said failure actuating circuit, and wherein said failure means is also effective for causing said controlling means to operate said releasing means.

8. The system set forth in claim 4 and having in addition releasing means for restoring said voltage increasing means to normal condition, failure means for indicating an un-ionized condition in said tube, a circuit for actuating said failure means, and means operative in response to the operation of said voltage increasing means to the final one of its series of steps for completing said failure actuating circuit, and wherein said impulsing means is also effective for operating said voltage increasing means, said failure means is also effective for causing the operation of said releasing means, and said failure means is effective for restoring said impulsing means to normal condition.

9. The testing device set forth in claim 4 and having in addition means operative in response to a predetermined number of cyclical operations of said impulsing means for advancing said voltage increasing means one step.

10. In a device for testing a tube wherein said tube comprises an anode, a starting anode and a cathode, a first voltage source, said first source being connected between said anode and said cathode and sufficient to maintain said tube in ionized condition, a second voltage source, said second source being connected between said cathode and said starting anode and insufficient to fire said tube, a third voltage source, impulsing means cyclically operative for momentarily connecting a voltage impulse from said third source between said cathode and said starting anode in order to apply the sum of said second and said third sources between said cathode and said starting anode, means operative from a normal condition through a series of steps under the control of said impulsing means for increasing the voltage of said third source through a corresponding series of steps, a plurality of indicating elements and a corresponding plurality of circuits, each of said circuits being used for energizing the corresponding one of said indicating elements, each of said elements and said circuits corresponding to one of the operated steps of said voltage increasing means, said voltage increasing means in any one of its operated conditions being effective for completing the corresponding one of said circuits, detecting means for determining an ionized condition in said tube, and energizing means operative for a predetermined time interval in response to the operation of said detecting means for energizing the completed one of said circuits.

11. The testing device set forth in claim 10 and having in addition means operative in response for a predetermined number of cyclical operations of said impulsing means for causing said voltage increasing means to be advanced one step away from its normal condition.

12. The device set forth in claim 10 and having in addition releasing means for restoring said voltage increasing means to normal condition, and means operative in response to the operation of said energizing means for operating said releasing means.

13. The device set forth in claim 10 and having in addition releasing means for restoring said voltage increasing means to normal condition, and means operative in response to the operation of said energizing means for operating said releasing means and for restoring said impulsing means to normal condition.

14. The testing device set forth in claim 10 and having in addition releasing means for restoring said voltage increasing means to normal condition, failure means for indicating an un-ionized condition in said tube, a circuit for actuating said failure means, controlling means operative in response to the operation of said energizing means for operating said releasing means, and means operative in response to the operation of said voltage increasing means to the final one of its series of steps for completing said failure means circuit, and wherein said failure actuating means is also effective for causing said controlling means to operate said releasing means.

15. The testing device set forth in claim 10 and having in addition releasing means for restoring said voltage increasing means to normal condition, failure means for indicating an un-ionized condition in said tube, a circuit for actuating said failure means, controlling means operative in response to the operation of said energizing means for operating said releasing means, and means operative in response to the operation of said voltage increasing means to the final one in its series of steps for completing said failure means circuit, and wherein said impulsing means is also effective for operating said voltage increasing means, said failure means is also operative for causing said controlling means to operate said releasing means, and said controlling means is further effective for restoring said impulsing means to normal condition.

References Cited in the file of this patent

UNITED STATES PATENTS

| | | |
|---|---|---|
| 2,088,317 | Bachelet | July 27, 1937 |
| 2,616,058 | Wagner | Oct. 28, 1952 |
| 2,761,104 | Morris | Aug. 28, 1956 |
| 2,841,762 | Bullard et al. | July 1, 1958 |